US010621065B2

(12) United States Patent
Nylander-Hill (10) Patent No.: US 10,621,065 B2
(45) Date of Patent: Apr. 14, 2020

(54) CONCURRENT LOGGING OF DATA LAYERS WITHIN A TAPE STORAGE DEVICE

(71) Applicant: International Business Machines Corporation, Armonk, NY (US)

(72) Inventor: Pamela R. Nylander-Hill, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 103 days.

(21) Appl. No.: 15/832,200

(22) Filed: Dec. 5, 2017

(65) Prior Publication Data

US 2019/0171543 A1    Jun. 6, 2019

(51) Int. Cl.
| | |
|---|---|
| *G11B 27/36* | (2006.01) |
| *G11B 15/00* | (2006.01) |
| *G06F 11/34* | (2006.01) |
| *G11B 5/55* | (2006.01) |
| *G11B 5/008* | (2006.01) |

(52) U.S. Cl.
CPC ...... *G06F 11/3476* (2013.01); *G06F 11/3409* (2013.01); *G11B 5/00813* (2013.01); *G11B 5/5508* (2013.01); *G06F 2201/86* (2013.01)

(58) Field of Classification Search
CPC . G11B 20/10009; G11B 27/36; G11B 15/005; G11B 15/46; G11B 15/06; G11B 15/43; G11B 5/584; G11B 5/588; G11B 20/10305; G11B 5/0078; G11B 5/02; G11B 2020/1292; G11B 2020/1265; G11B 19/048; G11B 20/1205; G11B 20/18

USPC ......... 360/25, 31, 48, 72.1, 73.04, 53, 74.5, 360/77.12, 69, 71, 74.4
See application file for complete search history.

(56) References Cited

U.S. PATENT DOCUMENTS

| | | |
|---|---|---|
| 7,280,293 B2 | 10/2007 | Nylander-Hill et al. |
| 8,001,416 B2 | 8/2011 | Leopold et al. |

(Continued)

OTHER PUBLICATIONS

IBM Appendix P., "List of IBM Patents or Patent Applications to be Treated as Related", Dated Herewith, 2 pages.

(Continued)

*Primary Examiner* — Nabil Z Hindi
(74) *Attorney, Agent, or Firm* — Endicott Drafting Center (57) ABSTRACT

Concurrent standard/high resolution logging of critical performance metrics and functional data for various functional areas including servo system, dataflow, channel, read/write, speed matching, and error recovery is achieved by segregating one or more rows of the tape map array for the purpose of logging only high resolution data. As performance data is logged to the standard resolution tape map by wrap and regional offset down tape, the reserved high resolution row logs data sequentially in the order it was processed on magnetic tape and not by its position on magnetic tape. The high-resolution performance data is concurrently logged with normal-resolution performance data as a supporting view with more detailed tape processing data should the normal-resolution performance data have inconclusive or insufficient content. High-resolution storage is structured for shorter regional logging or per-dataset logging of critical performance metrics and functional data, referred to herein as performance data.

20 Claims, 7 Drawing Sheets

(56) References Cited

U.S. PATENT DOCUMENTS

| | | | |
|---|---|---|---|
| 8,081,396 B2* | 12/2011 | Katagiri | G11B 5/00834 |
| | | | 360/48 |
| 9,355,675 B2 | 5/2016 | Nylander-Hill et al. | |
| 9,558,783 B2 | 1/2017 | Spivak | |
| 9,584,162 B1 | 2/2017 | Bentley et al. | |
| 9,805,760 B2* | 10/2017 | Partee | G11B 5/02 |
| 2005/0052772 A1 | 3/2005 | Barbian | |
| 2007/0253088 A1 | 11/2007 | Clarke et al. | |
| 2013/0044386 A1 | 2/2013 | Sato | |
| 2016/0012844 A1 | 1/2016 | Nylander-Hill et al. | |

OTHER PUBLICATIONS

Nylander-Hill et al., "Concurrent Logging of Data Layers Within a Tape Storage Device", U.S. Appl. No. 16/679,392, IBM, Filed Nov. 11, 2019, pp. 1-23.

* cited by examiner

CONCURRENT LOGGING OF DATA LAYERS WITHIN A TAPE STORAGE DEVICE

BACKGROUND

The present invention relates generally to the field of tape storage devices, and more particularly to data logging on magnetic tapes.

A tape drive is a data storage device typically used for offline, archival data storage. The tape drive reads and writes data, referred to herein as archival data, on a magnetic tape. Tape drives provide sequential access storage and must physically wind tape between reels to read any one particular piece of archival data on the tape. Modern advance in tape processing include partitioning, high resolution tape directories, and Random Access Ordering.

A tape drive records archival data longitudinally along a length of magnetic tape, parallel to the edges of the tape. Increasing recording densities lead to smaller track widths and multiple longitudinal passes for the same size tape. A physical "wrap" is defined in the industry as one trip from beginning of tape (BOT) to end of tape (EOT) and back again to BOT. For example, a 10 TB JD-type cartridge format written by a model TS1150 tape drive writes 32 simultaneous tracks with 160 wraps. Completely written, this yields 5,120 data tracks spanning the half inch distance between the top and bottom edge of the tape resulting in a track width of just 2.02 um. (Note: the term(s) "JD" and/or "TS1150" may be subject to trademark rights in various jurisdictions throughout the world and are used here only in reference to the products or services properly denominated by the marks to the extent that such trademark rights may exist.)

In order to achieve such a highly precise track placement, a servo system, an advanced servomechanism, is employed to make use of two active servo channels and a servo pattern pre-formatted on the tape, also referred to as media. This is a timing-based servo pattern, resembling a chevron shape, which configures 5 servo bands across the tape. Between each servo band is a data band. Continuing with the example, the 10 TB JD-type cartridge format places 40 physical wraps into each data band (20 read in the forward direction towards EOT, and 20 read in the backward direction towards BOT).

Track placement accuracy is achieved by positioning the servo readers relative to the data writers. Two active servo channels monitor read-back signals from the timing-based servo pattern to determine tape/head position and relative skew angles. In that way, the data channels are accurately positioned to the correct wrap location for processing data. The servo pattern also contains data having longitudinal distance (LPOS), so that the tape reference points from BOT can be determined.

Because the tape path supports media, there is continual head/tape contact affecting the tape head, the tape path, and the tape itself. Contact recording subjects the tape to wear and has an effect on magnetic field spacing, read/write signal amplitude, tape damage, cartridge capacity, and performance. Wear has an effect on servo tracking, magnetic field spacing, and signal amplitude. A clean, controlled environment that avoids high temperature, high humidity, and particulates is ideal to avoid certain problems including: (i) accelerated head wear when operating with green (new) and old media; (ii) media edge damage and debris lead to signal dropout and media imprinting (cleaning required); (iii) high temperature will increase pack tightness (hardband distortion of tape, wound-in debris affecting the magnetic layer, tape stick where layers adhere to each other); (iv) high humidity can cause the tape to stick to the head (running stiction or friction, tape slip); and (v) high humidity can cause tape to expand by absorbing moisture.

Tape drive microcode maintains an engineering data structure, known as a tape map, to record critical performance metrics and functional data sourced from various functional areas such as servo, dataflow, channel, read/write, speed matching, and error recovery. The tape map is a data structure with variable content that exists in microprocessor memory as part of a microcode dump file. The microcode dump file has large scope content intended for failure analysis. The dump file can be read from the tape drive by host command as a single file. Depending on what is of interest, various formatter tools are available to interpret the data in the microcode dump file. The tape map is extracted from the dump file and has its own formatter tool. The tape map also offers real-time dynamic feedback to microcode while archival data is being processed.

The tape map represents a physical tape layout. Errors, events of interest, and performance data are logged to the tape map with reference to tape position, or positionally, while the tape is loaded. The logging coordinates refer to (i) wrap number and (ii) horizontal position down tape between BOT and EOT. To determine the position down tape, the distance between EOT and BOT is divided into n-equal regions (e.g. the lpos region, where lpos stands for "longitudinal position"). Accordingly, all wraps have the same number of regions and the region beginning at LP3 (BOT) is always region 1. The wrap count, the region count, and the region size will vary according to the length of the tape and its particular format.

Failure analysis often involves examining the tape map to identify patterns, such as errors aggregating in bursts mostly at the end of tape and servo issues more in one direction than another. It should be noted that RW data is processed from BOT to EOT. Forward direction wraps are even numbered wraps and backward direction wraps are odd numbered. Therefore, movement is from BOT to EOT on the forward wraps and EOT to BOT on the backward wraps.

The tape map is stored as a three dimensional array indexed by wrap number and direction (column), and region number (row). Because each row represents a region, each row has a common offset from BOT, but each such offset projects across all wraps as identified by the column number. By definition, the first (zero) row of each column is reserved for wrap-oriented logging and is not positional.

Tape lengths vary among cartridge types and store archival data in a variety of recording formats. The tape map has a header to identify the cartridge recording format and other configuration information in support of data formatting. The size, content, and scope of the tape map data structure varies by product type and microcode level. Overall array size (header plus payload) defines the formatter key. Content produced on a device having the same formatter key will vary according to logging mode and changes in microcode logic used to produce the content. The formatter key and support fields in the header are both used in deciphering and interpreting the tape map payload data. Among other things, the formatter key defines the array dimensions: MAX_LPOS_REGIONS, MAX_HWRAPS, and MAX_DIR (2: forward and backward). How data logs to the tape map depends on the tape drive type, microcode level, and the recording format of the loaded cartridge.

SUMMARY

In one aspect of the present invention, a computer-implemented method, a computer program product, and a system for concurrent logging of performance data to a magnetic tape includes: (i) collecting performance data relating to operations of a tape drive reading data on a magnetic tape; (ii) representing the magnetic tape with a tape map having a data array structure representing subdivisions of a usable length of the magnetic tape correlating to a wrap number and longitudinal position of the magnetic tape; (iii) storing, on the tape map, the performance data as standard-resolution data; and (iv) storing, on the tape map, the performance data as high-resolution data logged sequentially according to dataset processing order. The representing step establishes a first portion of the tape map for storing the standard-resolution data and a second portion of the tape map for storing the high-resolution data.

In another aspect of the present invention, a method, a computer program product, and a system for concurrent logging of performance data to a specialized data structure in processor memory for the purpose of failure analysis includes: (i) collecting performance data relating to operations of a tape drive; (ii) standard formatting of this data into an array data structure modeling the physical layout of the tape cartridge using coordinates of wrap (vertical, column) and position along the length of tape (horizontal, row); (iii) providing a standard logging resolution along the length of tape by dividing the length of tape into equal-length regions or sections; (iv) reservation of a horizontal row(s) in this tape map data array to concurrently store high resolution data; (v) high resolution data does not store data positionally, but instead logs the most recent processed data in a sequential fashion by column in the reserved row; (vi) high resolution data can be at the dataset level or at a variable region width which is shorter than the standard resolution; (vii) once all the columns of the high resolution row have been populated, high resolution data logging can continue by wrapping back to column 1 to overwrite older data; and (viii) standard wrap/region logging does not overwrite like high resolution data but is additive in nature so that it represents the data processing experience over the full duration of time the cartridge is mounted on the drive.

In yet another aspect of the present invention, a method, a computer program product, and a system for concurrent logging of performance data to a specialized data structure in processor memory for the purpose of failure analysis includes: (i) collecting performance data relating to operations of a tape drive; (ii) formatting a tape map on a magnetic tape to include a standard resolution section and a high resolution section, the standard resolution area being formatted to record performance data in a normal tape resolution by position on tape, the high-resolution area being formatted to record performance data across smaller sections of tape or on a per-dataset basis in a sequential order based on processing sequence; (iii) storing the performance data on the standard resolution area of the tape map, the performance data stored in normal tape resolution by position on tape; and (iv) storing the performance data on the high resolution area of the tape map, the performance data stored in high tape resolution by sequential order of data being processed.

DETAILED DESCRIPTION

Concurrent standard/high resolution logging of critical performance metrics and functional data for various functional areas including servo system, dataflow, channel, read/write, speed matching, and error recovery is achieved by segregating one or more rows of the tape map array for the purpose of logging only high resolution data. As performance data is logged to the standard resolution tape map by wrap and regional offset down tape, the reserved high resolution row logs data sequentially in the order it was processed on magnetic tape and not by its position on magnetic tape. The high-resolution performance data is concurrently logged with normal-resolution performance data as a supporting view with more detailed tape processing data should the normal-resolution performance data have inconclusive or insufficient content. High-resolution storage is structured for shorter regional logging or per-dataset logging of critical performance metrics and functional data, referred to herein as performance data. The present invention may be a system, a method, and/or a computer program product. The computer program product may include a computer-readable storage medium (or media) having computer-readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
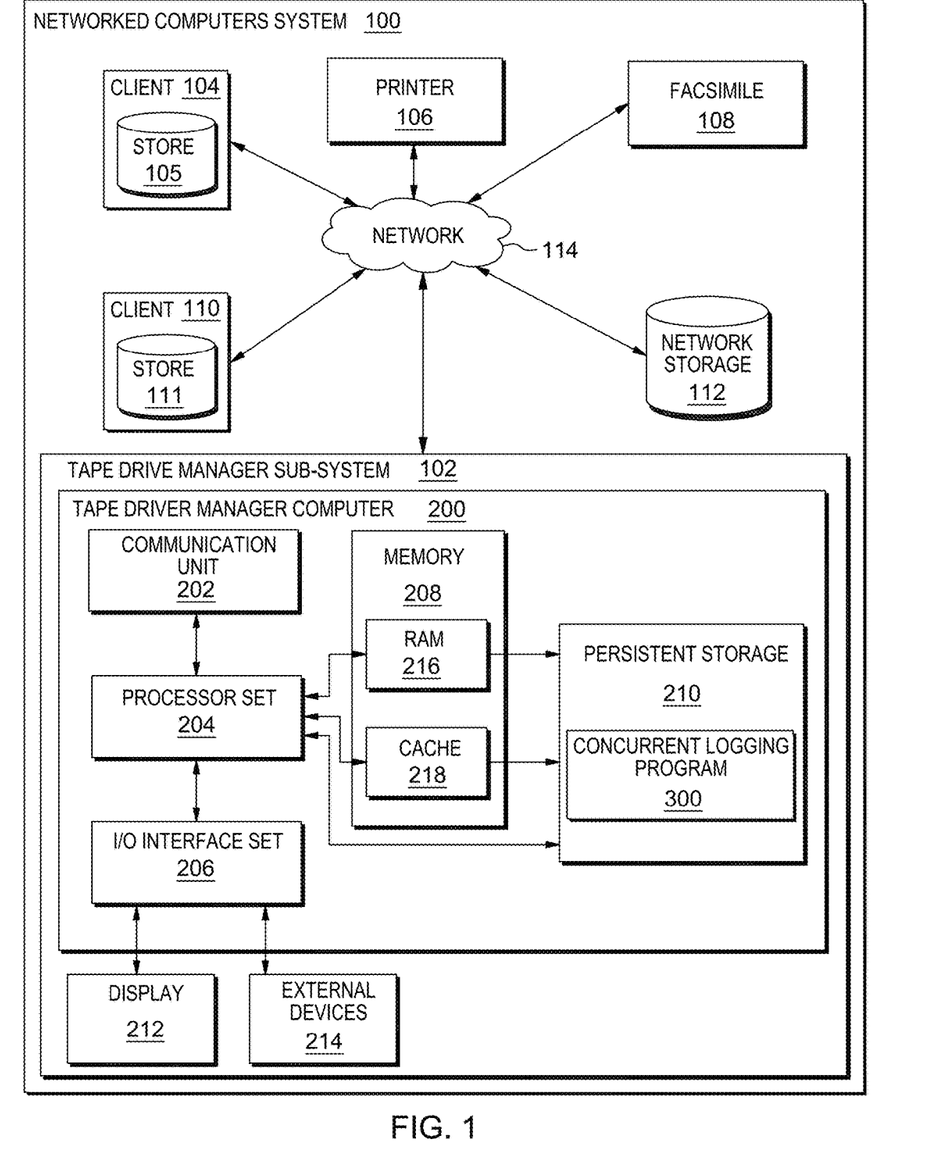
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: tape drive manager sub-system 102; client sub-systems 104, 110; data storage devices 105, 111; printer sub-system 106; facsimile sub-system 108; tape drive sub-system 112; communication network 114; tape drive manager computer 200; communication unit 202; processor set 204; input/output (I/O) interface set 206; memory device 208; persistent storage device 210; display device 212; external device set 214; random access memory (RAM) devices 230; cache memory device 232; and concurrent logging program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
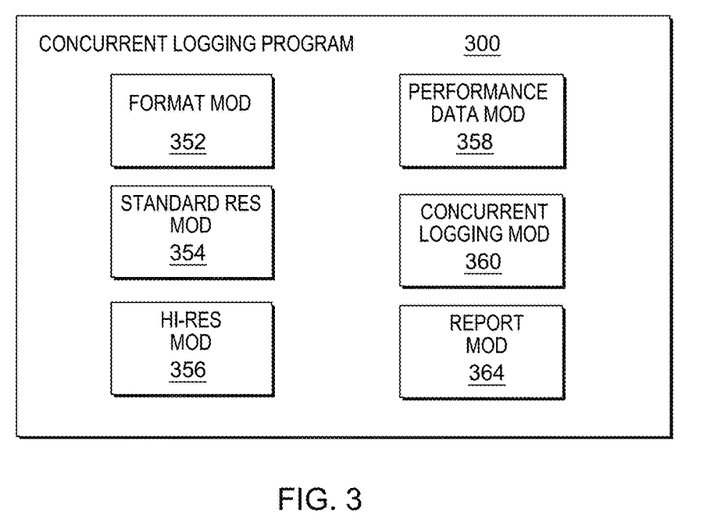
FIG. 3 is a schematic view of a machine logic (for example, software) portion of the first embodiment system.

Concurrent logging program 300 operates to concurrently log critical performance metrics and functional data for various functional areas including servo system, dataflow, channel, read/write, speed matching, and error recovery to a data map in both normal tape resolution (by position on tape) and in high tape resolution (sequentially in the order data was processed, either using region widths shorter than the standard width or on a per-dataset basis). High resolution region widths can be specified by the user, but are shorter than the standard region width. Concurrent performance data logging is achieved by specifically formatting a high-resolution portion of the tape map for recording hi-res performance data.

Some embodiments of the present invention recognize the following facts, potential problems and/or potential areas for improvement with respect to the current state of the art: (i) increased recording density creates size issues for diagnostic data structures, such as the tape map, that map the full physical tape layout; (ii) because the tape map is indexed by wrap and region (equal sections of tape spanning beginning of tape (BOT) to end of tape (EOT), large changes in wrap count are conventionally managed by reducing the region count; (iii) reducing the region count to accommodate large changes in wrap count has the effect of lowering the overall resolution of the tape map because critical performance metrics and functional data, referred to collectively as performance data, is accumulated against a larger number of datasets; and/or (iv) conventional practices to manage large changes in wrap count have the potential of "washing out" failure indicators and patterns recorded to the tape map.

As discussed in the Background Section, the tape map payload size varies by tape drive type; however, the biggest factors in increasing the overall array size of the tape map are increasing recording densities (more wraps) and longer tape lengths. When the recording density (wrap count) dramatically increases, this generally leads to a decrease in the allowed number of logged LPOS regions to maintain the overall tape map at an acceptable size. As recording densities increase the tape length tends to increase as well. Decreasing the max number of logged LPOS (longitudinal position) regions can greatly increase the LPOS region size. Increasing the LPOS region size lowers the resolution of the tape map because the tape map logs performance data across a larger longitudinal section of tape containing a larger number of datasets to be processed.

Reduced resolution of the tape map is acceptable in the nominal scenario where the tape drive is processing data without errors. In cases where the tape drive is experiencing a burst of errors in a localized area much smaller than an LPOS region, performance data can get washed out and make failure analysis less obvious.

To compensate for the lower resolution of the tape map, the tape drive microcode simultaneously logs high-resolution (or hi-resolution) performance data as a sliding window of most-recently processed tape datasets. In that way, when there is a permanent error, there will be both a nominal and hi-resolution view of the problem wrap. This hi-resolution logging is done by default, but tape drive microcode can be modified by external host control to capture hi-resolution performance data using various methods.

Figure 2:
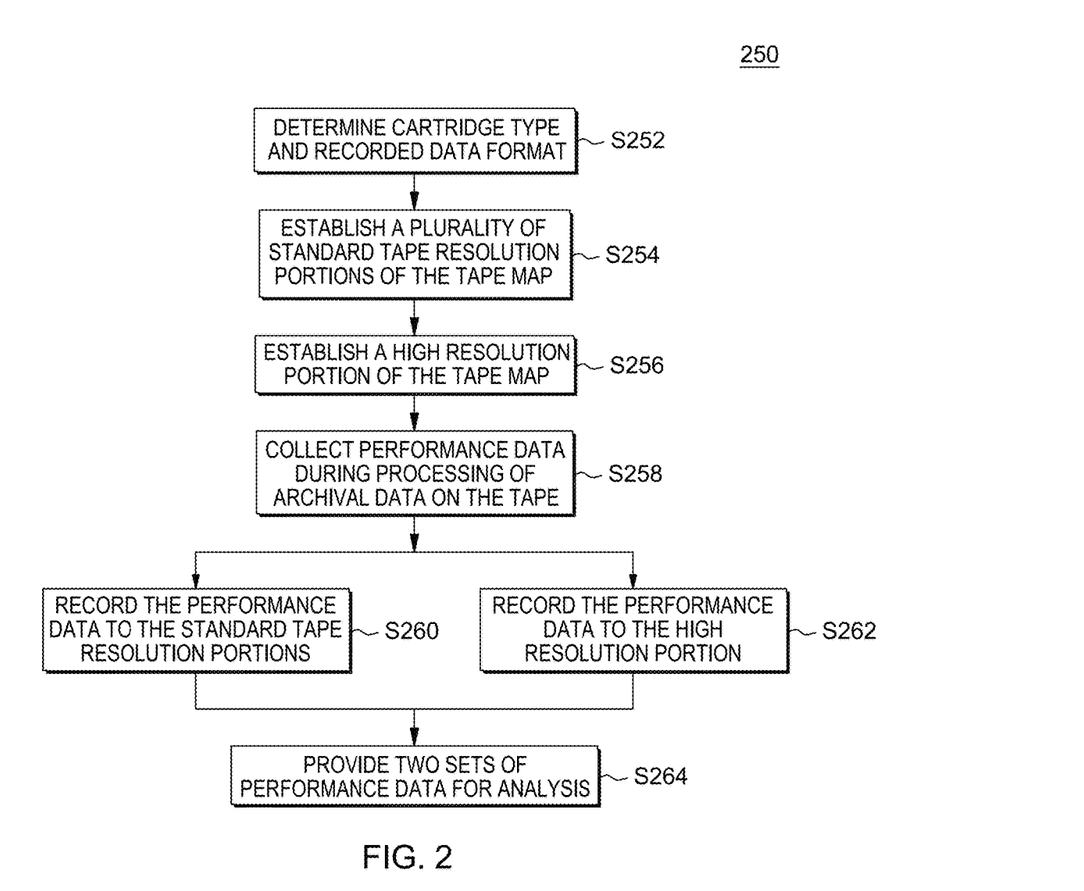
FIG. 2 is a flowchart showing a method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S252, where format module ("mod") 352 determine the loaded cartridge type and the recorded data format of the magnetic tape. The tape map header is then configured with identifying information for formatting and tape map payload is then cleared. As discussed above, a tap map is an engineering data structure to record critical performance metrics and functional data, referred to herein as performance data. Performance data is used primarily for failure analysis, but offers real-time dynamic feedback to microcode while the archival data is being processed.

The operation of providing feedback to microcode as described herein may be performed in real time to allow prompt response to functional problems encountered during data processing. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Processing proceeds to step S254, where standard tape resolution mod 354 establishes a plurality of standard tape resolution portions or array cells of the tape map identified by wrap number and region location according to the recognized recording format. The standard tape resolution portion of the tape map correlates with the position on the magnetic tape where archival data was collected. For the reasons stated above, standard resolution oftentimes is insufficient for effective failure analysis. For one reason, conventional practices to manage large changes in wrap count have the potential of "washing out" failure indicators and patterns recorded to the tape map. The standard resolution portions are divided equally over the width of the tape map, with additional room for at least a high-resolution portion. The divisions represent regions of the tape per given wrap for which performance data is obtained. Each region is marked on the tape by longitudinal position (LPOS) markers.

Figure 4:
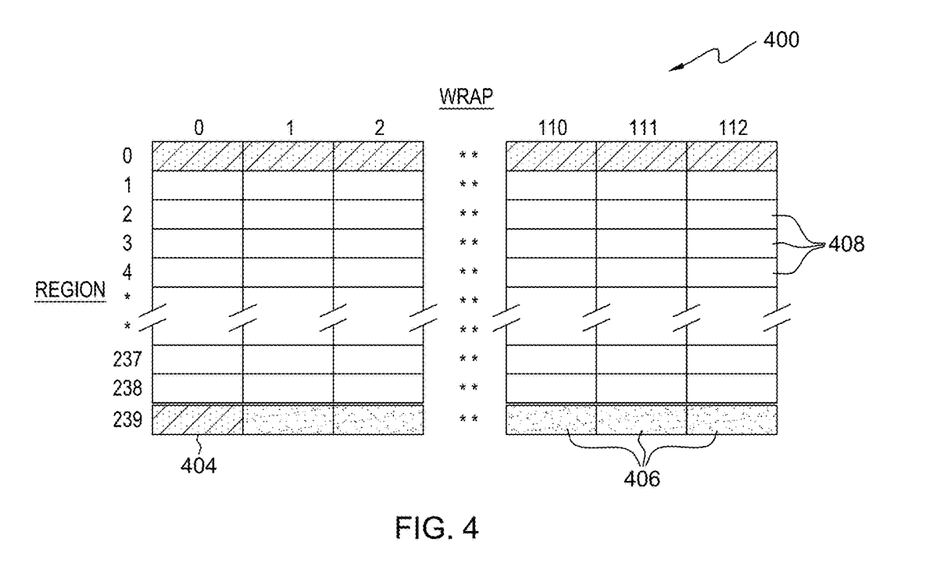
FIG. 4 is a diagram view showing information that is generated by and/or helpful in understanding embodiments of the present invention.

Processing proceeds to step S256, where high resolution mod 356 establishes a high-resolution portion of the tape map. In this embodiment, a single hi-res portion is established as the final row(s) of the tape map data array, as shown in FIG. 4, discussed in more detail below. In this way, the hi-res portion of the tape map can log to n-cells where n is the max number of wraps (columns). Each cell is the same payload size as one standard resolution cell, but represents data collected over a smaller section of tape or even just a single dataset.

Processing proceeds to step S258, where performance data mod 358 collects performance data during processing of archival data on the tape. Archival data is processed at standard resolution. During processing, such as read and write operations, information is collected that identifies various performance metrics and functions of the hardware and software performing the data processing. This information is stored as performance data in the tape map. In this example, the performance data is recorded concurrently in a standard tape resolution format and in a high tape resolution format. Alternatively, performance data is recorded in a manner not concurrent.

Processing proceeds to step S260, where concurrent logging mod 360 records the performance data to the standard tape resolution portions by physical location (wrap and region). In this example, as performance data is collected during archival data processing activities, the performance data is recorded in real time to the standard-resolution portion of the tape map.

Processing proceeds in parallel with step S260 to perform step S262, where concurrent logging mod 360 records the performance data to the high-resolution portion of the tape map, in a sequential manner without regard to position on tape. In this example, the performance data collected and stored to the standard-resolution portions is also stored concurrently to respectively corresponding sub-portions of the high-resolution portion of the tape map. That is, performance data collected during processing archival data in region 2/wrap 25 of the tape, is recorded to a corresponding region 2/wrap 25 cell of the standard-resolution portion of the tape map and is then concurrently recorded to the next sequential cell of the reserved high-resolution row of the tape map. Once the row is completed, logging continues by wrapping back to cell 1 of the high-resolution row and overwriting whatever data was logged there.

Processing ends at step S264, where report mod 364 provides two sets of performance data for analysis, including the standard-resolution data and the high-resolution data stored on the tape map. As described in more detail herein, the standard-resolution portions of the tape map may fail to provide sufficient patterns in performance data to support effective failure analysis. When the standard resolution portion is ambiguous or insufficient for any reason, the high-definition portion is available for more effective analysis. The hi-res performance data contains more information on data processing at time of permanent error or other condition of interest and offers additional insight into tape drive performance above what can be understood when analyzing standard-resolution performance data alone.

Conventional data logging to the tape map is performed positionally using coordinates of column (associated with the current wrap), and row (fixed-width sections of wrap indexed between BOT and EOT). As disclosed herein, hi-resolution performance data logging (hi-res data logging) offers several advantages to conventional data logging. Two methods of hi-res data logging are presented below, first, wrap/region logging, and second, dataset logging. Hi-res data logging is limited to the last row(s) of the tape map array indexing by column from 0 to n, where n is the maximum wrap (e.g. 239). For high-resolution logging; however, the interpretation of the column depends on the hi-res data logging method.

FIG. 4 depicts the tape map array 400, segmented into normal and high-resolution data areas. Normal-resolution performance data logs to the majority of the array in this example (columns 0 to 239 and rows 0 to 112). The hi-resolution performance data logs only to one row in this example (row 112 and columns 0 to 239). Special cells 402 in row 0 and 404 in row 112/column 0 contain no performance data. Hi-resolution cells 406 contain hi-resolution performance data. Normal resolution cells 408 contain normal-resolution performance data. In this example, only one row is used for hi-res data logging, region 112. Alternatively, the use of rows for hi-res data logging could be extended to other rows. Note that normal-resolution performance data 408 never logs to region zero of the normal-res portion because it contains special configuration and summary information for each wrap. Similarly, hi-resolution performance data does not log to wrap zero of the hi-res portion because it is reserved for hi-resolution configuration data and summary data.

Some embodiments of the present invention are directed to wrap/region logging, or regional logging, which is implemented as a sliding window of the most recent 238 such regions that were written or read. Note that high resolution logging contains position information, but is not logged positionally. It is a sequential set of data processed in the most recent set of wrap/regions. The high-resolution wrap/region cells are shorter than the standard wrap/region cells and this shorter length can be specified by the user be external host command. Since high-resolution logging represents a sliding window, row 112 of the tape map is managed as a wrapping buffer in this case.

Some embodiments of the present invention are directed high-resolution dataset logging. When practicing high-resolution dataset logging, each column cell represents information logged against an individual dataset. This is the highest possible resolution. High-resolution logging is still a sliding window in this case, so the tape map is managed as a wrapping buffer.

Regional logging is good for identifying tape damage or servo defects, because temps or other error indications create a failure pattern at common location(s) across multiple wraps. Head degradation can cause multiple channels to under-perform consistently or by direction. Since a cartridge can contain archival data written by more than one drive, a bad writer can also be identified. Dataset logging is good for detailed analysis of a defect.

Figure 5:
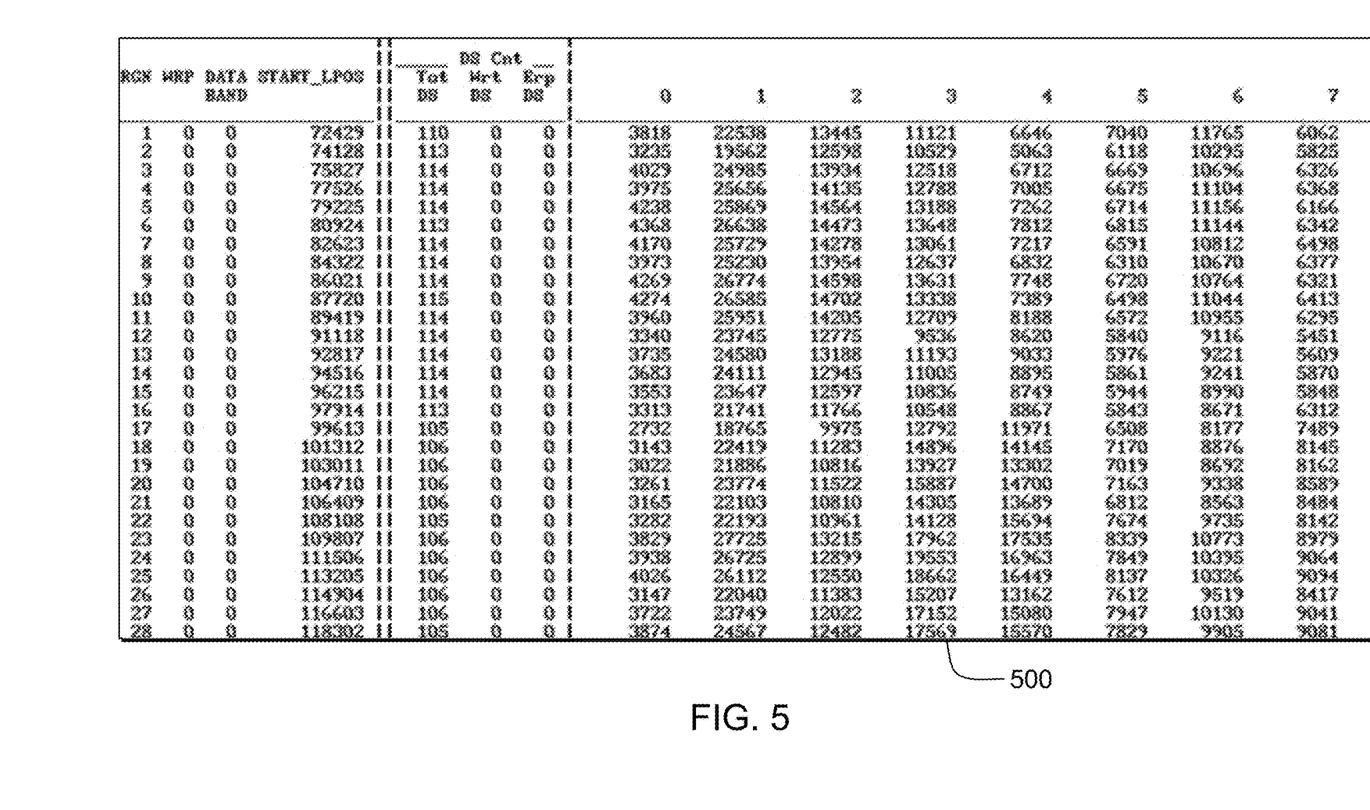
FIG. 5 is a table view showing information that is generated by and/or helpful in understanding embodiments of the present invention.
Figure 6:
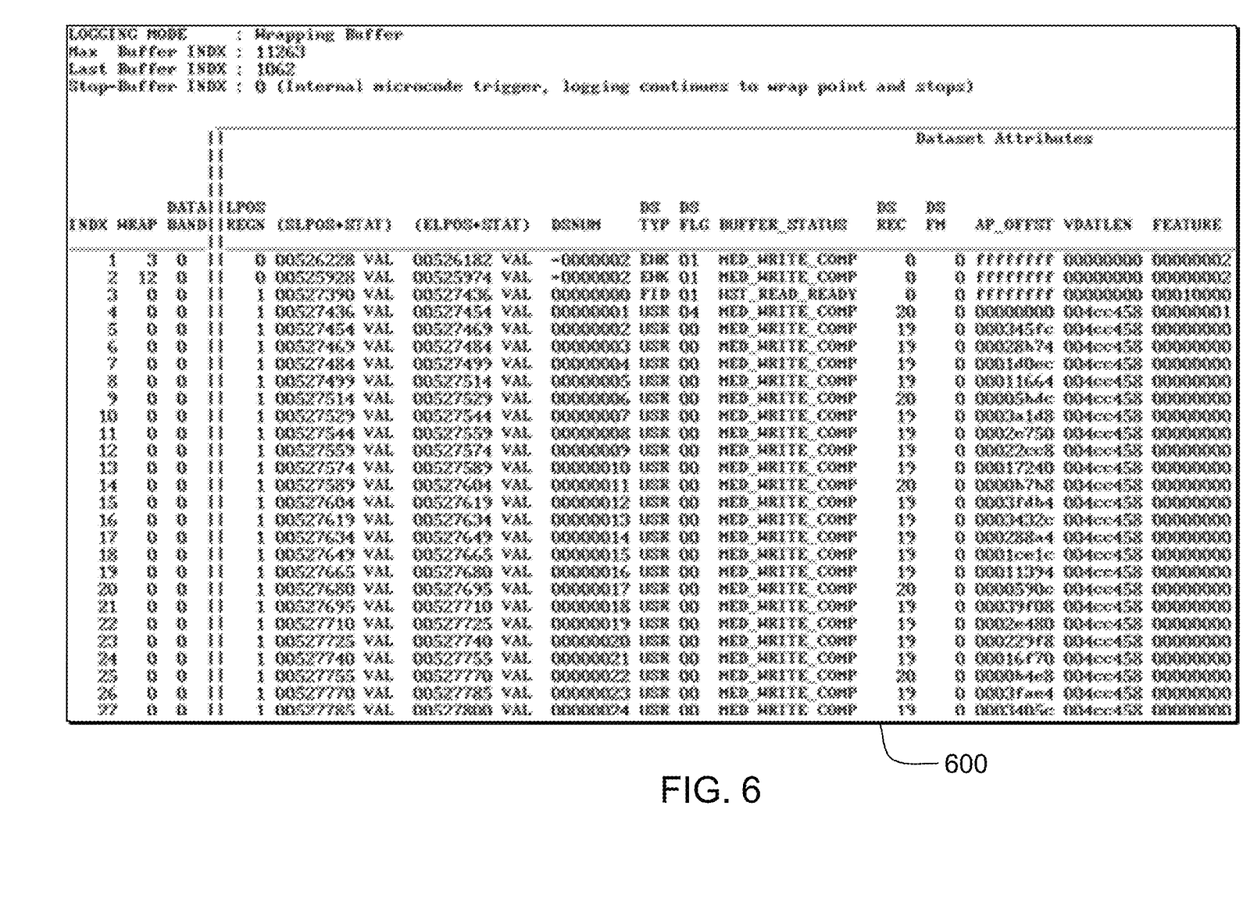
FIG. 6 is a table view showing information that is generated by and/or helpful in understanding embodiments of the present invention.

FIGS. 5 and 6 depict formatted tape map portions 500 and 600 respectively. Tape map portion 500 illustrates regional logging and tape map portion 600 illustrates dataset logging. These tape map portions highlight the differences between regional logging and dataset logging. Note that for regional logging (FIG. 5) each region on physical wrap 0 consists of input from over 100 datasets. Note that dataset logging (FIG. 6) represents actual archival data processing on the tape, so datasets on different wraps can appear sequentially.

Figure 7:
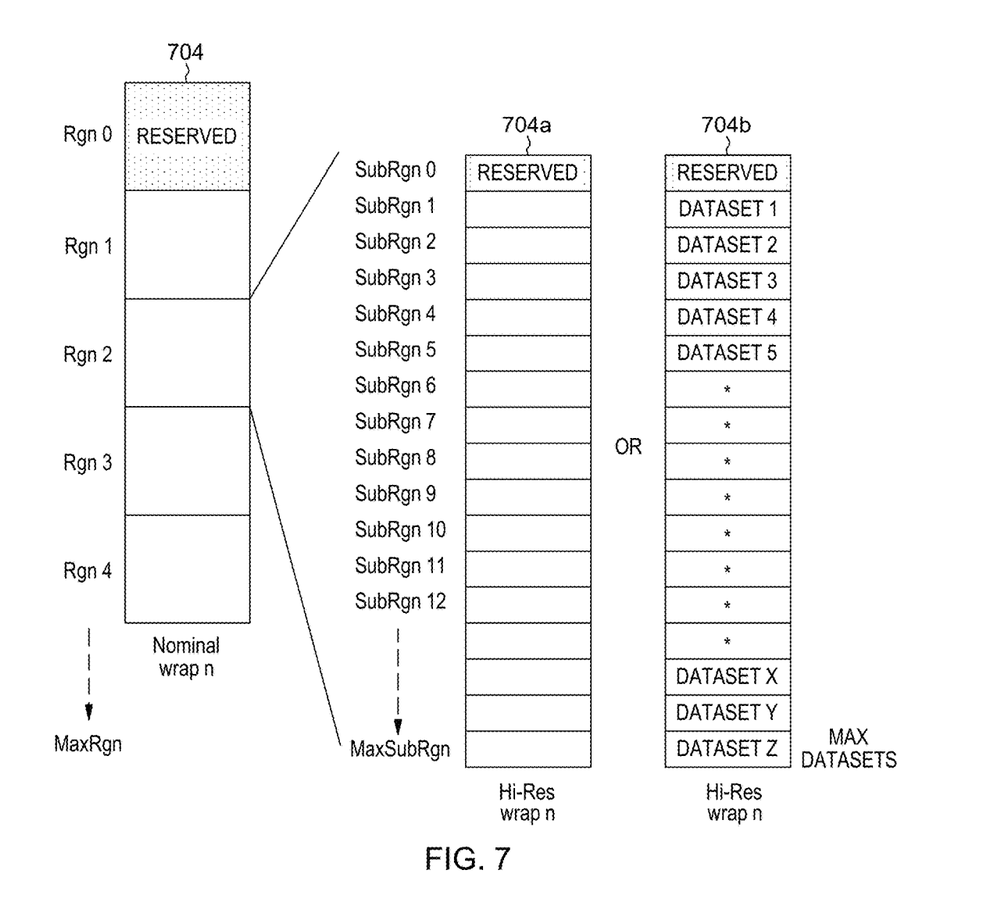
FIG. 7 is a diagram view showing information that is generated by and/or helpful in understanding embodiments of the present invention.

Referring now to FIG. 7, regional logging is further illustrated in a diagram. Column 702 shows normal tape resolution, where the tape is sub-divided into equal LPOS regions (Rgn 0, Rgn 1, Rgn 2, etc.) up to the max row count. LPOS region Rgn 0 is reserved for wrap-specific data. Column 704a illustrates the final row of the tape map storing hi-resolution performance data in the case of regional logging. Each "region" of the final row are relatively smaller in width than the normal-resolution cells. These hi-resolution regions (subrgn 0, subrgn 1, subrgn 3, etc.) are found in the final row of the tape map, which is a normal wrap sub-divided into equal LPOS sub-regions using the max column count (or max wrap). Column 704b shows the highest resolution logging where each column represents one dataset. So, the maximum number of datasets that can be logged before the row wraps back to overwrite is the maximum number of columns (or wraps, 239 in this example). High-resolution data can only log per-region or per-dataset, not both and is dependent on logging mode selected for high-resolution data.

Figure 8:
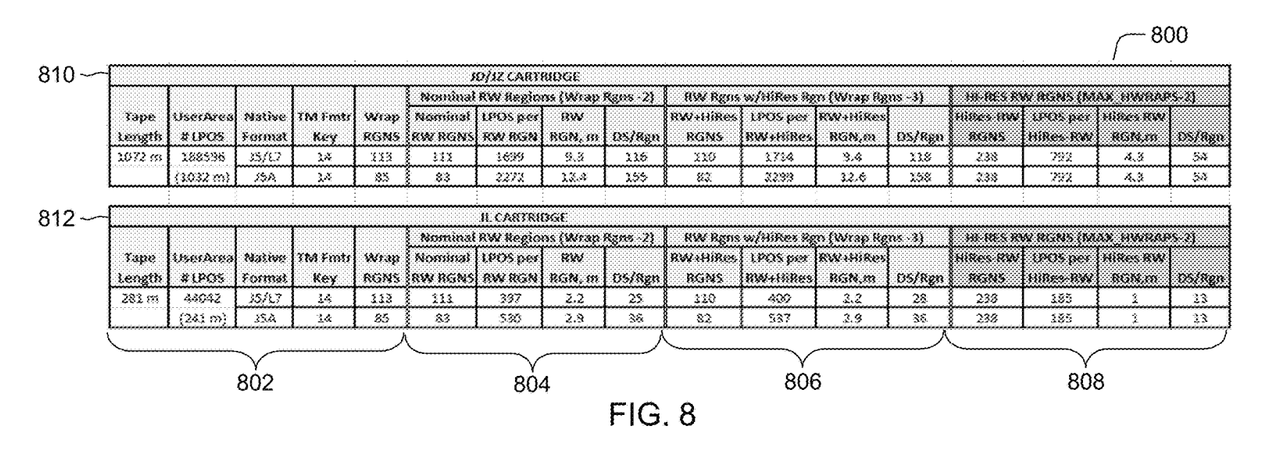
FIG. 8 is a table view showing information that is generated by and/or helpful in understanding embodiments of the present invention.
Figure 9:
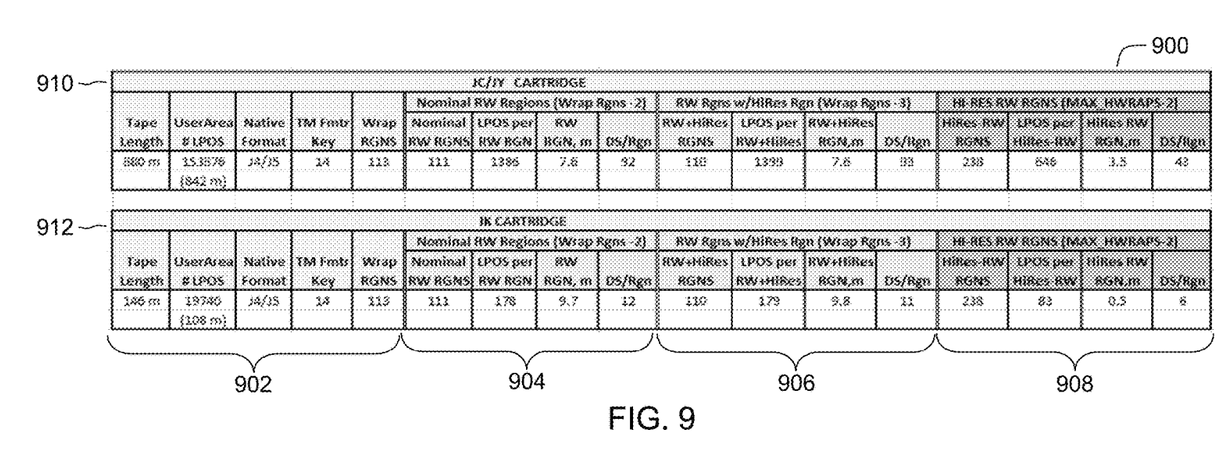
FIG. 9 is a table view showing information that is generated by and/or helpful in understanding embodiments of the present invention.

Tables 800 and 900 shown respectively in FIGS. 8 and 9 summarize a possible tape map resolution scheme for an archive drive, such as tape drive sub-system 112 (FIG. 1), and a family of drive types that share the same common tape map size (formatter key). The example archive drive is also capable of read and/or write according to a second cartridge format. The table in FIG. 8 provides information on tape map resolution for JD/JZ cartridge 810 and JL cartridge 812. The table in FIG. 9 provides information on tape map resolution for JC/JY cartridge 910 and JK cartridge 912 having the second cartridge format. Each table is organized by cartridge type 810, 812, 910, 912 and are grouped into two sets according to nominal dataset size and cartridge format. That is, for FIG. 8, Nominal ds=80 mm and μm/LPOS=5472, and for FIG. 9, Nominal ds=82 mm and μm/LPOS=5472.

The tables show RW region size by cartridge type for three different tape map logging control options. Columns 804 and 904 identify nominal RW region logging without hi-resolution logging of any kind. Columns 806 and 906 indicate how nominal RW region size changes when hi-resolution logging is enabled to repurpose logging of a full row. Columns 808 and 908 identify high-res logging metrics for regional logging. It should be noted that hi-resolution logging by region is disabled for JL cartridge 812 (FIG. 8) and JK cartridge 912 (FIG. 9) due to very small region size and potential for errors in positioning. If high-resolution logging is specified to be by dataset, then each cell will represent only one dataset.

Columns 802 and 902 provide helpful information regarding tape length, native format and number of wrap regions for the various cartridges 810, 812, 910, and 912. Note that the nominal cartridge format on JD/JZ cartridge 810 will log approximately 155 datasets in a 12.4 m region on given wrap (col. 804). When hi-res data logging is enabled, the dataset count goes up to approximately 158 in a 12.6 m region (col. 806). However, the last standard wrap that is processed is also shown in high resolution with approximately 54 datasets in a 4.3 m region (col. 808).

Hi-resolution performance data logging options and controls are implemented using the tape map write control command. Some embodiments of the present invention apply the following defaults for dataset logging: (i) sliding window of most recent datasets logged, as limited by the max allowed wrap count (default); (ii) the sliding window can contain regional or per-dataset information; (iii) number of tape map rows to be reserved for this purpose (default=1 row); (iv) static control: defer dataset logging pending pre-defined trigger criteria (dataset number, specific wrap or data band, specific region, specific direction); (v) dynamic control: defer dataset logging pending unspecified microcode trigger; (vi) no deferred logging, always log high-resolution data; and (vii) logging acts like a wrapping buffer by default unless wrapping is disabled statically or by dynamic trigger.

Some embodiments of the present invention apply the following defaults for regional logging: (i) regional logging of current wrap processing; (ii) static control: wrap subset can be by number, by direction, or by data band; and (iii) dynamic control: defer logging pending microcode trigger. Only performance data for the current wrap will be logged.

Some embodiments of the present invention are directed to providing tape drive microcode that simultaneously logs hi-resolution performance data as a sliding window of the most recently processed datasets. In this way if there is a permanent error there is both a nominal and a hi-resolution view of the problem wrap. The sliding window spans the last n-datasets processed. Additional options include having a higher resolution of the current wrap.

Some embodiments of the present invention may include one, or more, of the following features, characteristics and/or advantages: (i) provides a dataset-level resolution just prior to permanent error or other condition of interest; (ii) provides shorter, regional logging to an area of tape just prior to permanent error or other condition of interest; (iii) performance data is logged at multiple resolution layers because of partitioning rows of the data map; and/or (iv) high-resolution region or per-dataset logging is managed as a sliding window (wrapping buffer).

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for concurrent logging of performance data to a magnetic tape, the method comprising:

collecting performance data relating to operations of a tape drive reading data on a magnetic tape;

representing the magnetic tape with a tape map having a data array structure representing sub-divisions of a usable length of the magnetic tape correlating to a wrap number and longitudinal position of the magnetic tape;

storing, on the tape map, the performance data as standard-resolution data; and storing, on the tape map, the performance data as high-resolution data logged sequentially according to dataset processing order;

wherein:

the representing step establishes a first portion of the tape map for storing the standard-resolution data and a second portion of the tape map for storing the high-resolution data.

2. The computer-implemented method of claim 1, wherein:

the second portion of the tape map is divided into one or more rows having equal size and number of columns as the first portion.

3. The computer-implemented method of claim 1, wherein:

the first portion of the tape map is indexed with a row and column scheme corresponding to a position on the magnetic tape such that rows represent equal regions of magnetic tape length between BOT and EOT and a set of columns representing a count of wraps of the magnetic tape; and the second portion of the tape map includes high-resolution columns equal to the set of columns and represent sequential data processing.

4. The computer-implemented method of claim 1, wherein the performance data includes information corresponding to at least one of: servo system, dataflow, channel, read/write, speed matching, and error recovery.

5. The computer-implemented method of claim 1, wherein storing the performance data as high-resolution data is performed as a sliding window of most-recently processed regions on the magnetic tape.

6. The computer-implemented method of claim 1, wherein storing the performance data as high-resolution data is performed as a sliding window of most-recently processed datasets on the magnetic tape.

7. The computer-implemented method of claim 1, further comprising:

recording to a first cell of each row in the second portion only high-resolution configuration data and high-resolution summary data.

8. The computer-implemented method of claim 1, wherein storing the performance data as standard-resolution data and storing the performance data as high-resolution data is performed concurrently.

9. The computer-implemented method of claim 1, further comprising:

responsive to an condition of interest, providing a set of performance data for analysis, a set of performance data including the standard-resolution data and the high-resolution data.

10. A computer system for concurrent logging of performance data to a magnetic tape, the computer system comprising:

a processor set; and a computer readable storage medium;

wherein:

the processor set is structured, located, connected, and/or programmed to run program instructions stored on the computer readable storage medium; and the program instructions include:

first program instructions programmed to collect performance data relating to operations of a tape drive reading data on a magnetic tape;

second program instructions programmed to represent the magnetic tape with a tape map having a data array structure representing sub-divisions of a usable length of the magnetic tape correlating to a wrap number and longitudinal position of the magnetic tape;

third program instructions programmed to store, on the tape map, the performance data as standard-resolution data; and fourth program instructions programmed to store, on the tape map, the performance data as high-resolution data logged sequentially according to dataset processing order;

wherein:

the representing step establishes a first portion of the tape map for storing the standard-resolution data and a second portion of the tape map for storing the high-resolution data.

11. The computer system of claim 10, wherein:

the first portion of the tape map is indexed with a row and column scheme corresponding to a position on the magnetic tape such that rows represent equal regions of magnetic tape length between BOT and EOT and a set of columns representing a count of wraps of the magnetic tape; and the second portion of the tape map includes high-resolution columns equal to the set of columns and represent sequential data processing.

12. The computer system of claim 10, wherein the performance data includes information corresponding to at least one of: servo system, dataflow, channel, read/write, speed matching, and error recovery.

13. The computer system of claim 10, wherein storing the performance data as high-resolution data is performed as a sliding window of most-recently processed regions on the magnetic tape.

14. The computer system of claim 10, wherein storing the performance data as high-resolution data is performed as a sliding window of most-recently processed datasets on the magnetic tape.

15. A computer program product comprising a computer-readable storage medium having a set of instructions stored therein which, when executed by a processor, causes the processor to concurrently log performance data to a magnetic tape by:

collecting performance data relating to operations of a tape drive reading data on a magnetic tape;

representing the magnetic tape with a tape map having a data array structure representing sub-divisions of a usable length of the magnetic tape correlating to a wrap number and longitudinal position of the magnetic tape;

storing, on the tape map, the performance data as standard-resolution data; and storing, on the tape map, the performance data as high-resolution data logged sequentially according to dataset processing order;

wherein:

the representing step establishes a first portion of the tape map for storing the standard-resolution data and a second portion of the tape map for storing the high-resolution data.

16. The computer program product of claim 15, wherein:

the first portion of the tape map is indexed with a row and column scheme corresponding to a position on the magnetic tape such that rows represent equal regions of magnetic tape length between BOT and EOT and a set of columns representing a count of wraps of the magnetic tape; and the second portion of the tape map includes high-resolution columns equal to the set of columns and represent sequential data processing.

17. The computer program product of claim 15, wherein storing the performance data as high-resolution data is performed as a sliding window of most-recently processed regions on the magnetic tape.

18. The computer program product of claim 15, wherein storing the performance data as high-resolution data is performed as a sliding window of most-recently processed datasets on the magnetic tape.

19. The computer program product of claim 15, further comprising:

recording to a first cell of each row in the second portion only high-resolution configuration data and high-resolution summary data.

20. The computer program product of claim 15, wherein storing the performance data as standard-resolution data and storing the performance data as high-resolution data is performed concurrently.

* * * * *